United States Patent Office 2,701,265
Patented Feb. 1, 1955

2,701,265

TREATMENT OF DIOLEFINIC TERPENES

Karl Büchner, Duisburg-Hamborn, and Hermann Stader, Oberhausen, Germany, assignors to Ruhrchemie Aktiengesellschaft, Oberhausen-Holten, Germany, a corporation of Germany No Drawing. Application August 17, 1950,
Serial No. 180,082

Claims priority, application Germany August 31, 1949

3 Claims. (Cl. 260—598)

This invention relates to new and useful improvements in the treatment of diolefinic terpenes.

It is known to be possible to add carbon monoxide and hydrogen onto olefinic double linkages when using suitable catalysts at increased pressure. This reaction is termed catalytic formylation, and is effected ordinarily with the use of water gas and preferably with catalysts of the cobalt type.

When catalytically formylating diolefines, however, the observation was made that only one of the two double linkages will enter into reaction. The other double linkage will remain partly unreacted within the molecule, is partly saturated by hydrogen of the water gas used for the reaction, and is partly the cause of undesirable condensation reactions which lead to a polymerization of the reaction products. These side reactions of the diolefines diminish the yield of valuable formylation products and increase the proportion of higher boiling products especially that of the so-called heavy oils. These difficulties are particularly experienced in the use of diolefinic terpenes.

It was discovered that good yields of terpene aldehydes and terpene alcohols may be obtained in the formulation of relatively low boiling diolefinic terpenes by subjecting the diolefinic terpenes for a prolonged period of time and prior to the water gas addition to treatment with the catalysts to be used for that reaction. For this purpose, the same amount of catalyst and at least the same temperature is used as will be applied to the subsequent water gas addition. It is also possible to employ higher temperatures up to about 190° C. for this pretreatment of the diolefines and to follow the period of pretreatment with a cooling to a temperature of about 130–140° C. which is the one required for the water gas addition. The duration of the required pretreatment is about one hour. Particularly advantageous results are obtained for such pretreatment with cobalt thorium silica catalysts of the type conventionally used for catalytic carbon monoxide hydrogenation.

The method according to the invention is suitable for all diolefinic terpenes boiling below 160° C. and which may, for example, be distilled off from turpentine oil. The diolefinic terpene hydrocarbons of oil of turpentine are converted by the use of cobalt catlysts into substantially mono-olefinic terpenes such as camphene and pinene. The conversion may be commenced in accordance with the invention at about normal room temperature. If the diolefinic terpene mixture to be treated is poured over a cobalt catalyst, an appreciable heating occurs which leads to the distillation of the terpene. At this an intermolecular transposition of the terpenes occurs. This reaction is, however, impaired by the presence of oxygenous terpene derivatives.

The treatment in accordance with the invention does not result in a polymerization or condensation of the terpenes. Also, the molecular weight of the starting material remains unchanged. The iodine number decreases to half its original value while the index of refraction increases.

Optimum conversion is obtained at temperatures of approximately 170° C., suitable temperatures, however, ranging from substantially 0 to 300° C., it being possible to obtain satisfactory conversion results when operating in liquid as well as in gaseous phase.

Camphene may be obtained by cooling of the products resulting from the treatment in accordance with the invention. The addition of dry hydrochloric acid results in the formation of pinene hydrochloride. Yet, neither camphene nor pinene could be isolated from the starting material prior to the treatment in accordance with the invention.

Once the diolefinic terpenes have been converted by the treatment in accordance with the invention into the monoolefinic compounds, the latter may be subsequently converted with good yields into saturated terpene aldehydes by the catalytic addition of water gas. These terpene aldehydes may then be in turn reacted by either simultaneous or subsequent hydrogenation to form the corresponding terpene alcohols which are characterized by a high viscosity and a pleasant odor. This hydrogenation may, however, also be carried out with nickel catalysts or copper oxide chrome oxide catalysts.

The method in accordance with the invention may be practised with particular advantage in connection with diolefinic terpenes of the empirical formula $C_{10}H_{16}$. Such a starting material yields terpene alcohols of the general formula $C_{11}H_{20}O$ which are especially useful as for example for the production of foaming and wetting agents, softening materials, cosmetic preparations, and perfume materials.

Example I

A terpene fraction was obtained from Portuguese turpentine, the fraction having a boiling point of from 149–153.8° C., a specific gravity of 0.863, and a refractive index of $n_D^{20} = 1.4652$. The iodine number was about 349, and the molecular weight about 136. 1000 cc. of this terpene fraction was used, being slowly dropped in the course of five hours onto 100 cc. of a cobalt thorium magnesium silica catalyst. The catalyst was contained in a 1000 cc. distillation column, provided with an overhead run-off. The drop-by-drop-added terpene fraction caused a heating of the catalyst to such an extent that the reaction product distilled off in substantially gaseous form.

The starting material, having an original boiling point of from 149–153.8° C., yielded a hydrocarbon mixture, the initial boiling point of which was at about 152° C. The further distillation gave the following results:

Up to 161° C., 50 vol. percent distilled over
Up to 164.2° C., 60 vol. percent distilled over
Up to 168.5° C., 70 vol. percent distilled over
Up to 172.0° C., 80 vol. percent distilled over
Up to 175.5° C., 93 vol. percent distilled over The individual fractions possess the following characteristics:

| | Refractive Index, $n_D^{20}$ | Iodine Number | Molecular Weight |
|---|---|---|---|
| 161–164.2° C | 1.4700 | 154 | 136 |
| 164.2–168.5° C | 1.4717 | 144 | 136 |
| 168.5–172.0° C | 1.4753 | 130 | 136 |
| 172.0–175.0° C | 1.4800 | 132 | 137 |
| above 175.0° C | 1.4838 | 176 | 172.5 |

These data show that the diolefinic components of the turpentine oil fraction used were converted without appreciable change of their molecular weight into mono-olefinic terpenes.

Example II

A terpene fraction having a boiling point between about 153.8 and 154.9° C. was used. The same possessed the following characteristics:

Density _____$D_{20}$__ 0.861
Refractive index_____$n_D^{20}$__ 1.4654
Iodine number_____ 373
Molecular weight_____ 136

The terpene fraction was heated for one hour in an autoclave at a temperature of about 170° C. in contact with 10 vol. per cent of the catalyst specified in Example I. A terpene mixture was obtained in this manner having a boiling point beween 157 and 176.8° C. and the following characteristics:

| | | |
|---|---|---|
| Density | $D_{20}$ | 0.859 |
| Refractive index | $n_D^{20}$ | 1.4714 |
| Iodine number | | 179 |
| Molecular weight | | 136 |

It will be thus seen that also in this case the molecular weight was not changed by the treatment in accordance with the invention.

*Example III*

2500 cc. of a terpene fraction boiling between about 153 and 154° C. were brought into an autoclave of about 4000 cc. capacity. The terpene was obtained by fractionated distillation of a commercial oil of turpentine having an iodine number of about 380. 250 cc. of a reduced cobalt catalyst were introduced into the autoclave simultaneously with the terpene fraction, the catalyst being one as it is conventionally used for the catalytic carbon monoxide hydrogenation of the Fischer-Tropsch type. The autoclave was thereupon closed and treated for about one hour at a temperature of about 170° C. The reaction mix was then permitted to cool down to about 135° C. and thereafter water gas was continuously introduced into the autoclave while maintaining the pressure at about 150 kilograms per square centimeter to thereby accomplish the formylation reaction in as such well known manner. The resulting aldehyde compounds were thereupon hydrogenated in conventionally known manner in the same autoclave. For this hydrogenation the same catalyst and nearly the same pressure were used as for the foregoing addition of water gas ($CO+H_2$) on to the olefinic double linkages. The thusly obtained reaction products were then separated by filtration from the contact catalyst. The product obtained in this manner was then fractionated first at 30 mm. mercury and thereafter at 2–3 mm. mercury. Approximately 500 cc. of a first run of saturated terpene hydrocarbons was obtained and, in addition, a fraction of about 1500 cc. of terpene alcohols having a boiling point at a pressure of about 3 mm. mercury of 105–155° C.; and there was finally obtained 500 cc. of a relatively heavy viscous residue.

If the reaction is only through to aldehyde formation, it is possible to free the reaction products to an appreciable extent of their metal content by their hydrogenation at about 120° C. at ordinary or in excess of atmospheric pressure.

As will be thus seen from the foregoing, the invention essentially comprises the contacting of a diolefinic terpene hydrocarbon with a formylation type catalyst such as a catalyst containing a metal of the eighth group of the periodic system and preferably one containing at least one member of the group consisting of cobalt and nickel, and maintaining this contact to thereby form a mono-olefinic terpene. The contact is preferably maintained for a period of about one hour.

Within the preferred embodiment of the invention, the monoolefinic terpene recovered from the diolefinic catalytic conversion in accordance with the invention may then be formylated to form a terpene aldehyde by the catalytic addition of water gas in the presence of a catalyst similar or identical to the one used for the diolefinic to mono-olefinic terpene conversion. The temperature of reaction for either the contact conversion in accordance with the invention or for the formylation of converted mono-olefinic terpene material may range from 0 to 300° C., being preferably, however, about 140–190° C. for the contact conversion, and 130–140° C. for the formylation. Within the still further preferred embodiment of the invention, the terpene aldehydes formed by the formylation reaction may be converted by hydrogenation into the corresponding saturated terpene alcohols and preferably by hydrogenation in the same reaction vessel using the same catalyst material as was used for the diolefinic to mono-olefinic terpene conversion and for the formylation of the mono-olefinic terpenes formed.

We claim:

1. In the method for the preparation of saturated terpene aldehydes and terpene alcohols from diolefinic terpene hydrocarbons by the contacting of a diolefinic terpene hydrocarbon boiling below 160° C. with a carbon monoxide hydrogen containing gas in the presence of a cobalt catalyst, the improvement which comprises precontacting said diolefinic terpene hydrocarbon with said cobalt catalyst as the sole active agent, at a temperature ranging from about 0° C. to 300° C.; prior to said contacting with said carbon monoxide hydrogen containing gas for a period of time of at least one hour.

2. Improvement according to claim 1, in which said diolefinic terpene has the empirical formula $C_{10}H_{16}$ and in which said catalyst is a cobalt-thorium-magnesium-silica catalyst.

3. In the method for the preparation of saturated terpene aldehydes and terpene alcohols from diolefinic terpenes by contacting a diolefinic terpene hydrocarbon boiling below 160° C. and having the empirical formula $C_{10}H_{16}$ with a carbon monoxide hydrogen containing gas in the presence of a cobalt-thorium-magnesium-silica catalyst at a temperature of about 130 to 140° C., the improvement which comprises precontacting said diolefinic terpene hydrocarbon with said catalyst as the sole active agent at a temperature of about 140 to 190° C. prior to said contacting with said carbon monoxide hydrogen containing gas for a period of time of at least one hour.

References Cited in the file of this patent

UNITED STATES PATENTS

| | | |
|---|---|---|
| 1,879,767 | Schoeller et al. | Sept. 27, 1932 |
| 2,327,066 | Roelen | Aug. 17, 1943 |
| 2,339,429 | Rummelsburg | Jan. 18, 1944 |
| 2,394,691 | Ipatieff et al. | Feb. 12, 1946 |
| 2,400,012 | Littman | May 7, 1946 |
| 2,437,600 | Gresham et al. | Mar. 9, 1948 |
| 2,501,200 | Wearn | Mar. 21, 1950 |